US012581057B2

(12) United States Patent  
Cui

(10) Patent No.: US 12,581,057 B2  
(45) Date of Patent: Mar. 17, 2026

(54) VIDEO PREDICTIVE CODING METHOD AND APPARATUS

(71) Applicant: BIGO TECHNOLOGY PTE. LTD., Singapore (SG)

(72) Inventor: Tongbing Cui, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 350 days.

(21) Appl. No.: 18/256,894

(22) PCT Filed: Dec. 3, 2021

(86) PCT No.: PCT/CN2021/135246  
§ 371 (c)(1),  
(2) Date: Jun. 9, 2023

(87) PCT Pub. No.: WO2022/121786  
PCT Pub. Date: Jun. 16, 2022

(65) Prior Publication Data  
US 2024/0098248 A1 Mar. 21, 2024

(30) Foreign Application Priority Data  
Dec. 11, 2020 (CN) .......................... 202011459744.1

(51) Int. Cl.  
*H04N 19/105* (2014.01)  
*H04N 19/159* (2014.01)  
(Continued)

(52) U.S. Cl.  
CPC ......... *H04N 19/105* (2014.11); *H04N 19/159* (2014.11); *H04N 19/176* (2014.11); *H04N 19/192* (2014.11); *H04N 19/52* (2014.11)

(58) Field of Classification Search  
CPC .. H04N 19/105; H04N 19/107; H04N 19/119; H04N 19/147; H04N 19/159;  
(Continued)

(56) References Cited

U.S. PATENT DOCUMENTS

2006/0193385 A1 8/2006 Yin et al.  
2008/0019448 A1* 1/2008 Lee ........................ H04N 19/51  
375/E7.122  
(Continued)

FOREIGN PATENT DOCUMENTS

CN 104918047 A 9/2015  
CN 105828084 A 8/2016  
(Continued)

OTHER PUBLICATIONS

"A Layered Structure Prediction Method for Mode Decision in Video Enc ding"—Liu et al., 2012 Eighth International Conference on Intelligent Information Hiding and Multimedia Signal Processing; 978-0-7695-4712-1/12 $26.00 © 2012 IEEE. (Year: 2012).*  
(Continued)

*Primary Examiner* — Mainul Hasan  
(74) *Attorney, Agent, or Firm* — Kolitch Romano Dascenzo Gates LLP

(57) ABSTRACT

Provided is a method for video predictive coding. The method includes: acquiring decision information related to a current coding block in inter-frame predictive coding, wherein the decision information includes one of: pre-analysis information determined by a coder in a lightweight video coding pre-analysis, coding information of a plurality of sub-blocks acquired by recursively coding the current coding block, and information of an executed mode determined based on the executed mode; and determining, based on the decision information, whether to skip motion estimation (ME) coding of the current coding block.

15 Claims, 4 Drawing Sheets

Determining, in response to determining that a current prediction unit is a non-square prediction unit, whether the SATD cost of the MERGE mode is less than the SATD cost of the temporary best mode ⟋ S31

Executing the MERGE mode on the non-square prediction unit in response to determining that the SATD cost of the MERGE mode is less than the SATD cost of the temporary best mode, and skipping forward ME coding, backward ME coding, and bidirectional ME coding of the non-square prediction unit ⟋ S32

(51) Int. Cl.
$$\begin{array}{ll} \textit{H04N 19/176} & (2014.01) \\ \textit{H04N 19/192} & (2014.01) \\ \textit{H04N 19/52} & (2014.01) \end{array}$$

(58) Field of Classification Search
CPC .... H04N 19/192; H04N 19/52; H04N 19/557; H04N 19/567; H04N 19/577; H04N 19/59

See application file for complete search history.

(56) References Cited

U.S. PATENT DOCUMENTS

| | | | | |
|---|---|---|---|---|
| 2011/0051813 | A1* | 3/2011 | Krishnan | H04N 19/557 375/E7.123 |
| 2012/0328015 | A1 | 12/2012 | Kim et al. | |
| 2015/0085935 | A1* | 3/2015 | Chen | H04N 19/597 375/240.16 |
| 2017/0094311 | A1 | 3/2017 | Chou et al. | |
| 2019/0028732 | A1 | 1/2019 | Takano | |
| 2020/0382793 | A1* | 12/2020 | Gao | H04N 19/147 |

FOREIGN PATENT DOCUMENTS

| | | | | | |
|---|---|---|---|---|---|
| CN | 107396102 | A | 11/2017 | | |
| CN | 108848381 | A | 11/2018 | | |
| CN | 109729351 | A | 5/2019 | | |
| CN | 110351552 | A | 10/2019 | | |
| CN | 110896481 | A | 3/2020 | | |
| CN | 112637592 | A | 4/2021 | | |
| JP | 2007524279 | A | 8/2007 | | |
| JP | 2012065176 | A | 3/2012 | | |
| JP | 2012080387 | A | 4/2012 | | |
| KR | 20110069740 | A1 | 6/2011 | | |
| KR | 20130087133 | A | 8/2013 | | |
| WO | 2011129672 | A2 | 10/2011 | | |
| WO | WO-2017122604 | A1 | * 7/2017 | ........... | H04N 19/176 |
| WO | WO-2020134817 | A1 | * 7/2020 | ........... | H04N 19/159 |

OTHER PUBLICATIONS

"An Adaptive Fast Algorithm for Coding Block Mode Selection"—Zhu et al., Third International Symposium on Intelligent Information Technology and Security Informatics; 978-0-7695-4020-7/10 $26.00 © 2010 IEEE. (Year: 2010).*

"SKIP Prediction for Fast Rate Distortion Optimization in H.264"—Saha et al., 0098 3063/07/$20.00 © 2007 IEEE. (Year: 2007).*

"A Layered Structure Prediction Method for Mode Decision in Video Encoding"—Liu et al., 2012 Eighth International Conference on Intelligent Information Hiding and Multimedia Signal Processing; 978-0-7695-4712-1/12 $26.00 © 2012 IEEE. (Year: 2012).*

International Search Report of the International Searching Authority for State Intellectual Property Office of the People's Republic of China in PCT application No. PCT/CN2021/135246 issued on Feb. 23, 2022, which is an international application to which this application claims priority.

Supplementary Partial European Search Report Communication Pursuant to 164(1) EPC of European application No. 21902493.2 issued on Jan. 19, 2024.

China National Intellectual Property Administration, First Office Action in Chinese Patent Application No. 202011459744.1 issued on Feb. 8, 2024,, which is a foreign counterpart application corresponding to this U.S. Patent Application, to which this application claims priority.

Ding, Yuan-yuan, et al.; "A Fast H. 264 Inter-frame Prediction Algorithm for Special Mode", Acta Armamentarii, vol. 32 No. 4, Apr. 15, 2011, entire document.

Shafique, Muhammad, et al.; "An HVS-based Adaptive Computational Complexity Reduction Scheme for H.264/AVC Video Encoder using Prognostic Early Mode Exclusion", 2010 Design, Automation & Test in Europe Conference & Exhibition : Date 2010; Dresden, Germany, Mar. 8-12, 2010, IEEE, Piscataway, NJ, US, Mar. 8, 2010, pp. 1713-1718, ISBN: 978-1-4244-7054-9, section II first three paragraphs.

Liu, Peng-yu, et al.; "A Fast H. 264 Inter-frame Prediction Algorithm for Special Mode", Acta Armamentarii, vol. 32 No. 4, Apr. 15, 2011, entire document.

Extended European Search Report Communication Pursuant to Rule 62 EPC for European Application No. 21902493.2 dated May 21, 2024, which is a foreign counterpart application to this application.

Notice of Reasons for Refusal of Japanese application No. 2023-535576 issued on Jun. 24, 2024.

Cheng, Zhengxue, et al., "Merge mode based fast inter prediction for HEVC", 2015 Visual Communications and Image Processing (VCIP), IEEE, Dec. 13, 2015, pp. 1-4, DOI: 10.1109/VCIP.2015.7457826, figure 4, section III.B.

Park, Sang-Hyo, et al., "Fast Affine Motion Estimation for Versatile Video Coding (VVC) Encoding", IEEE Access, vol. 7, Nov. 5, 2019, pp. 158075-158084, DOI: 10.1109/ACCESS.2019.2950388, section II.b.

Wang, Jie, et al., "Efficient algorithms for HEVC bitrate transcoding", Multimedia Tools and Applications, Kluwer Academic Publishers, Boston, US, vol. 76, No. 24, Dec. 17, 2016, pp. 26581-26601, ISSN: 1380-7501, DOI : 10.1007/S11042-016-4182-8, section 3.2.

Yang, Jungyoup, et al., "Early SKIP Detection for HEVC", and JCTVC-G JCTVC-G543, Nov. 19, 2011, p. 1, p. 2.

* cited by examiner

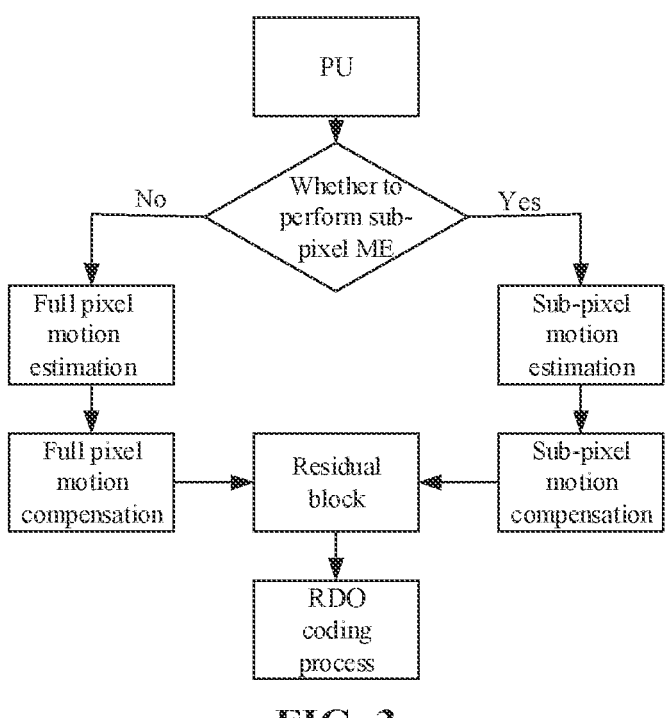

Acquiring decision information related to the current coding block in inter-frame predictive coding, wherein the decision information includes one of: pre-analysis information determined by a coder in a lightweight video coding pre-analysis, coding information of a plurality of sub-blocks acquired by recursively coding the coding block, and information of an executed mode determined based on the executed mode — 410

Determining, based on the decision information, whether to skip motion estimation (ME) coding of the current coding block — 420

Determining, based on a size of the current coding block, a number of corresponding downsampling blocks, and indexing the pre-analysis information of plural downsampling blocks — S11

Summarizing the pre-analysis information of the downsampling blocks, and determining, based on a result of the summarization, whether to skip the ME coding of the current coding block — S12

FIG. 5

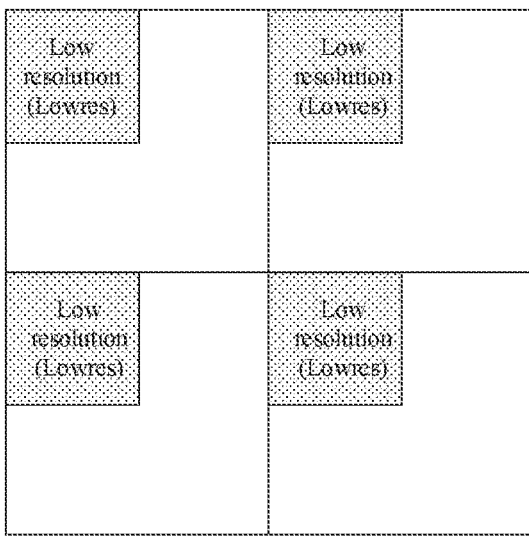

FIG. 6

Determining, based on the best mode of each of the plurality of sub-blocks of the current coding block, a second ratio at which the best mode of the current coding block is an intra-frame prediction mode, and a third ratio at which the best mode of the current coding block is a SKIP mode — S21

Determining a recursion ratio of the plurality of sub-blocks of the current coding block based on whether to recursively divide each of the plurality of sub-blocks of the current coding block — S22

Determining, based on at least one of the second ratio, the third ratio, and the recursion ratio of the plurality of sub-blocks, whether to skip the ME coding of the current coding block — S23

FIG. 7

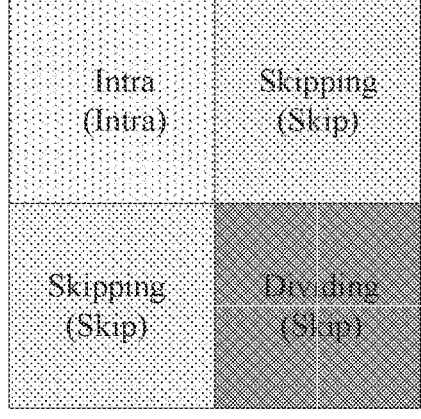

FIG. 8

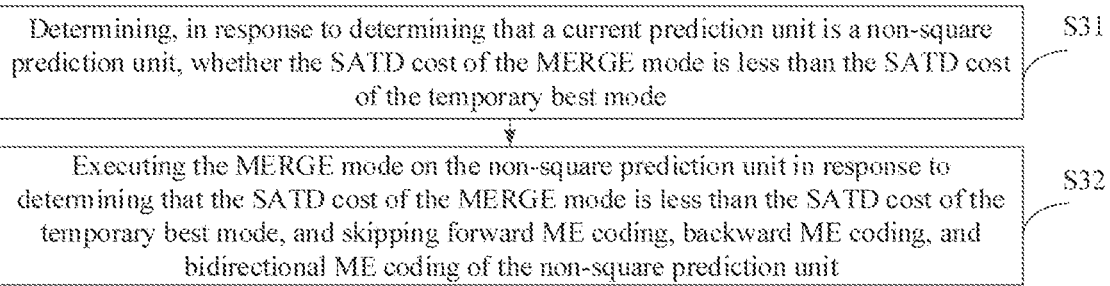

Determining, in response to determining that a current prediction unit is a non-square prediction unit, whether the SATD cost of the MERGE mode is less than the SATD cost of the temporary best mode ⟋ S31

Executing the MERGE mode on the non-square prediction unit in response to determining that the SATD cost of the MERGE mode is less than the SATD cost of the temporary best mode, and skipping forward ME coding, backward ME coding, and bidirectional ME coding of the non-square prediction unit ⟋ S32

FIG. 9

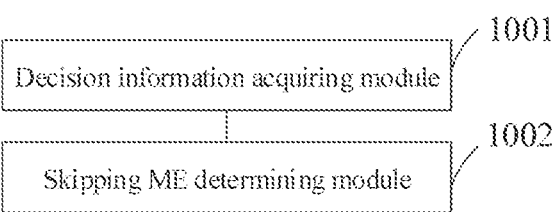

Decision information acquiring module ⟋ 1001

Skipping ME determining module ⟋ 1002

FIG. 10

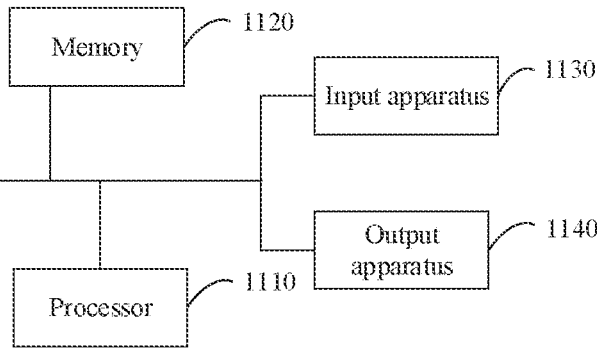

Memory ⌐ 1120

Input apparatus ⌐ 1130

Output apparatus ⌐ 1140

Processor ⌐ 1110

FIG. 11

VIDEO PREDICTIVE CODING METHOD AND APPARATUS

CROSS-REFERENCE TO RELATED APPLICATIONS

The present disclosure is a U.S. national stage of international application No. PCT/CN2021/135246, filed on Dec. 3, 2021, which is based on and claims priority to Chinese Patent Application No. 202011459744.1, filed on Dec. 11, 2020, the disclosures of which are herein incorporated by references in their entireties.

TECHNICAL FIELD

Embodiments of the present disclosure relate to video coding technologies, for example, a method and an apparatus for video predictive coding.

BACKGROUND OF THE INVENTION

In a coding framework, predictive coding is essential in video coding, and predictive coding involves intra-frame prediction and inter-frame prediction. The intra-frame prediction is to predict a current pixel, according to a spatial correlation of a video image, using neighboring coded pixels in an image. The inter-frame coding is to predict a to-be-coded image, according to temporal correlation of a video image, using a coded image. By the intra-frame and inter-frame prediction, a coder eliminates the spatial and temporal correlations of a video, and transforms, quantizes, and entropy codes a predicted residual instead of an original pixel value, such that a coding efficiency is greatly improved.

SUMMARY OF THE INVENTION

Embodiments of the present disclosure provide a method and an apparatus for video predictive coding.

The embodiments of the present disclosure provide a method for video predictive coding. The method includes:

acquiring decision information related to a current coding block in inter-frame predictive coding, wherein the decision information includes one of: pre-analysis information determined by a coder in a lightweight video coding pre-analysis, coding information of a plurality of sub-blocks acquired by recursively coding the current coding block, and information of an executed mode determined based on the executed mode; and determining, based on the decision information, whether to skip motion estimation (ME) coding of the current coding block, wherein the skipping the ME coding includes skipping all ME and skipping partially ME.

The embodiments of the present disclosure further provide an electronic device for video predictive coding. The electronic device includes a memory, a processor, and a computer program stored on the memory and runnable on the processor, wherein the processor, when loading and running the program, is caused to perform the method described above.

The embodiments of the present disclosure further provide a non-volatile computer-readable storage medium storing a computer program stored therein, wherein the computer program, when loaded and run by a processor, causes the processor to perform the method described above.

BRIEF DESCRIPTION OF THE DRAWINGS

FIG. 3 is a schematic diagram of a coding process of a single inter-frame mode according to some embodiments of the present disclosure;

FIG. 4 is a flow chart of a method for video predictive coding according to some embodiments of the present disclosure;

FIG. 5 is a flow chart of a ME fast skipping decision based on pre-analysis information according to some embodiments of the present disclosure;

FIG. 6 is a schematic diagram of a relationship between recursive dividing of a coding block and a downsampling block according to some embodiments of the present disclosure;

FIG. 7 is a flow chart of a ME fast skipping decision based on coding information of a sub-block according to some embodiments of the present disclosure;

FIG. 8 is a schematic diagram of recursive dividing of a coding block according to some embodiments of the present disclosure;

FIG. 9 is a flow chart of a ME fast skipping decision for a non-square PU based on information of an executed mode according to some embodiments of the present disclosure;

FIG. 10 is a structural block diagram of an apparatus for video predictive coding according to some embodiments of the present disclosure; and FIG. 11 is a schematic structural diagram of an electronic device according to some embodiments of the present disclosure.

DETAILED DESCRIPTION OF THE INVENTION

Figure 1:
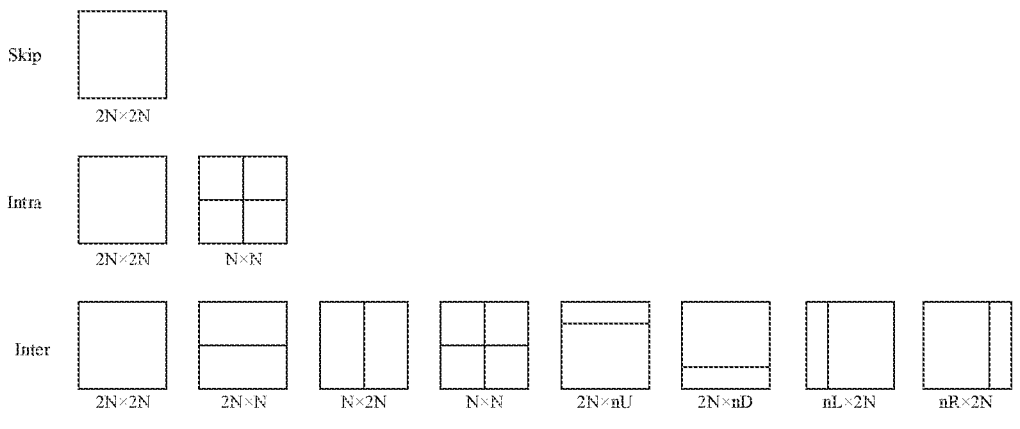
FIG. 1 is a schematic diagram of a dividing mode of a PU according to some embodiments of the present disclosure.

The present disclosure will be further described in detail hereinafter with reference to the accompanying drawings and the embodiments. It can be understood that the specific embodiments described herein are merely used for explaining the present disclosure and are not intended to limit the present disclosure. In addition, it shall be noted that for convenience of description, only the portions associated with the present disclosure, rather than the entire structure, are shown in the drawings.

Currently, in mainstream video coding standards, inter-frame prediction adopts block-based motion compensation (MC). A main principle is that motion estimation (ME) is executed in a reference frame by a prediction unit (PU) to search for a matched block, a prediction block is generated using the motion compensation technology to acquire a residual block, and then the residual block is used as an input of a subsequent coding module for the next coding processing. In addition, as not all object motion is full pixel motion, and only half a pixel or $\frac{1}{4}$ pixel may be moved, sub-pixel ME is also required. That is, sub-pixel data is generated by an interpolation method based on a full pixel, and then search and compensation of the matched block are performed in the sub-pixel. In high efficiency video coding (HEVC), a highest precision of a luminance component sub-pixel is $\frac{1}{4}$ pixel and a highest precision of a chrominance component sub-pixel is $\frac{1}{8}$ pixel.

Inter-frame coding PUs in the HEVC include at least seven cases: 2N×2N/BIDIR, 2N×N/N×2N/2N×nD/2N×nU/ nR×2N/nL×2N (RECT/AMP), the above inter-frame coding process is performed on each of the PUs, and thus calculation overhead is very large.

The embodiments of the present disclosure are applicable to a predictive coding stage in video coding. Predictive coding indicates predicting a current sample value based on one or several coded sample values by a model or method, coding a difference value between a true value and a predicted value of a sample, and converting, quantifying, and entropy coding a predicted residual rather than an original pixel value, such that a coding efficiency is greatly improved. The predictive coding includes an intra-frame prediction (Intra) mode and an inter-frame prediction (Inter) mode.

A new video compression standard (high efficiency video coding, HEVC) defines a new set of syntax units including a coding unit (CU), a prediction unit (PU), and a transform unit (TU) for image dividing. The CU is a basic unit for processing, such as prediction, transformation, quantization, and entropy coding. The PU is a basic unit for predictive coding, including intra-frame prediction and inter-frame prediction. The TU is a basic unit for transformation and quantization. The PU specifies all prediction modes of the CU, and all information related to prediction is defined in the PU. For example, a direction of intra-frame prediction, a partitioning mode of inter-frame prediction, motion vector prediction, and an inter-frame predictive reference image index belong to a category of the PU.

FIG. 1 is a schematic diagram of a PU dividing mode. A PU dividing mode in a 2N×2N CU includes: two alternative modes of an intra-frame prediction PU: 2N×2N and N×N for a CU mode of 2N×2N; eight alternative modes of an inter-frame predictive PU: four symmetric modes (2N×2N, 2N×N, N×2N, N×N) and four asymmetric modes (2N×nD, 2N×nU, nR×2N, nL×2N). Based on a shape of the PU, modes of 2N×2N and N×N are referred to as square PUs, modes of 2N×N, N×2N, 2N×nD, 2N×nU, nR×2N, nL×2N are referred to as non-square PUs. A skip mode is a kind of inter-frame prediction, and is a 2N×2N skip mode in the case that motion information required to be coded is only a motion parameter set index, and the coding residual does not require to be coded.

Figure 2:
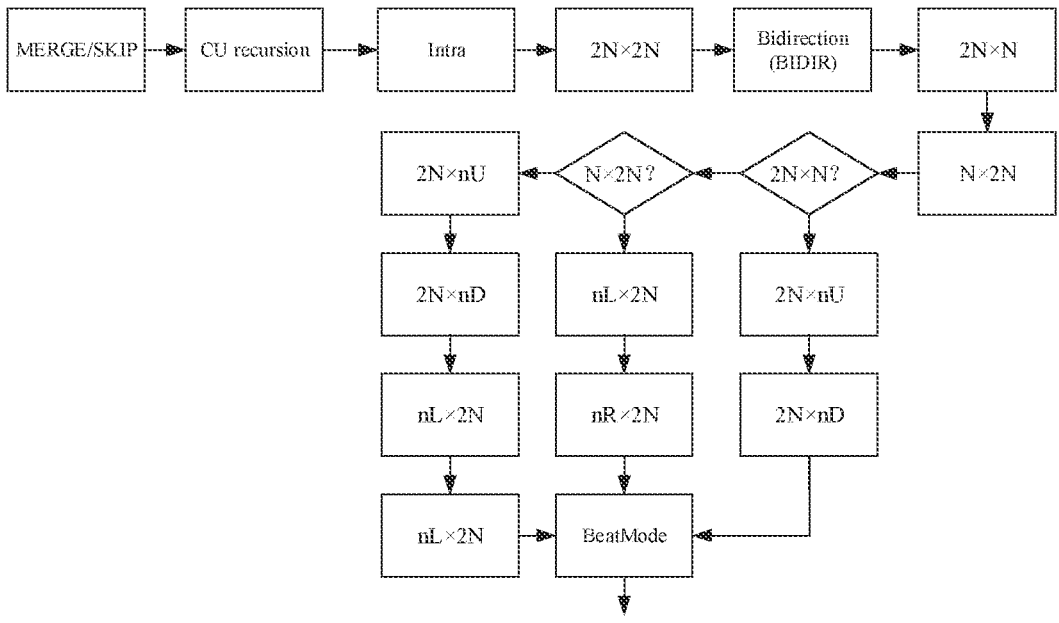
FIG. 2 is a schematic diagram of a decision-making process for a best mode of an inter-frame predictive coding process of a single PU according to some embodiments of the present disclosure.

FIG. 2 is a schematic diagram of a decision-making process for a best mode of an inter-frame predictive coding process of a single PU. As shown in FIG. 2, the decision-making process includes the following processes (N×N mode is not used in FIG. 2).

Firstly, a 2N×2N merge/skip (MERGE/SKIP) mode is executed. In the case that a recursive condition is satisfied, a CU recursive mode is executed, a CU of a size of the current block is returned upon completion of the recursion, and the intra-frame prediction (Intra) mode is continuously executed. Upon completion of the Intra mode, the 2N×2N inter-frame mode is executed (a best matched block is acquired by forward motion estimation (ME) and backward ME). Then 2N×2N bidirectional (BIDIR) is executed (only bidirectional search is performed to acquire a best matched block), and 2N×N and N×2N mode types are continuously executed. Mode decision is performed each completion of one mode to acquire the temporary best mode (tempBest-Mode).

Upon execution of the N×2N mode, in the case that tempBestMode=2N×N, modes of 2N×nU and 2N×nD are continuously executed, and comparison is made to acquire the final best mode (BestMode); in the case that tempBestMode=N×2N, modes of nL×2N and nR×2N are continuously executed, and comparison is made to acquire the BestMode; and in the case that tempBestMode !=2N×N && tempBestMode !=N×2N, 2N×nU, modes of 2N×nD, nL×2N, and nR×2N are continuously executed, and comparison is made to acquire the BestMode.

It should be noted that in the case that CU recursion is performed on the current block, the above decision-making process is then executed with a unit of a sub-block, the cost of the BestMode is compared with a recursive cost to determine whether to perform the recursive dividing on the CU.

In addition, non-square modes, such as 2N×N, N×2N, 2N×nU, 2N×nD, nL×2N, nR×2N, include two PUs, a MERGE/SKIP mode, a forward ME, a backward ME, and a bidirectional ME are required to be executed on each PU, and a best mode is acquired by comparison.

In addition, as not all object motion is full pixel motion, and only half a pixel or ¼ pixel may be moved, the sub-pixel ME is also required. That is, sub-pixel data is generated by an interpolation method based on a full pixel, and then search and compensation of the matched block are performed in a sub-pixel, such that a highest precision of a luminance component sub-pixel is ¼ pixel and a highest precision of a chrominance component is ⅛ pixel in HEVC. FIG. 3 shows a coding process of a single inter-frame mode in the plural modes of FIG. 2. For one PU, whether to perform sub-pixel ME is first determined, motion estimation and motion compensation of a sub-pixel are performed based on a result of the determination of performing the sub-pixel ME, motion estimation and motion compensation of a full pixel are performed based on a result of the determination of not performing the sub-pixel ME, and then a rate-distortion optimization (RDO) coding process is performed on the acquired residual block.

It can be seen that the inter-frame coding process in FIG. 3 is performed on each inter-frame PU, such that an overhead is great. In the case that unnecessary PU ME is reduced, the resource overhead of the coder is reduced to a great extent, such that coding speed is increased, and a coding cost is reduced.

It should be noted that the following embodiments of the present disclosure are applicable to any block-based hybrid coding architecture, all coders in accordance with the coding standard of HEVC, and other coders in accordance with standards upon adjustment, such as AVS1, H.264, VP8, VP9, AVS2, AVS3, AV1, and VVC. In addition, the coder mentioned in the embodiments is applicable to both a transcoding service and a real-time coding service of a mobile terminal.

FIG. 4 is a flow chart of a method for video predictive coding according to some embodiments of the present disclosure. The embodiments include the following processes.

In S410, decision information related to a current coding block is acquired in inter-frame predictive coding, wherein the decision information includes: pre-analysis information determined by a coder in a lightweight video coding pre-analysis, coding information of a plurality of sub-blocks acquired by recursively coding the current coding block, and information of an executed mode determined based on the executed mode.

In S420, whether to skip ME coding of the current coding block is determined based on the decision information.

For example, for a decision-making process shown in FIG. 2, in a best mode decision of an inter-frame prediction mode for a current PU, whether to skip the ME process of the plurality of modes in the above decision-making process is determined based on the acquired decision information. Skipping the ME process includes two cases. One case is skipping all ME in the above decision-making process, and the other case is skipping partially ME in the above decision-making process. For example, ME of 2N×2N mode is executed, and ME of other modes after 2N×2N modes is skipped.

For a scenario of skipping all the ME in the above decision-making process, whether to skip the ME process is determined in different manners based on different acquired decision information in the embodiments.

In some embodiments, a decision to fast skip the ME coding is made based on the pre-analysis information, and the decision information includes the pre-analysis information determined by the coder in the lightweight video coding pre-analysis. As shown in FIG. 5, S420 includes the following sub-steps.

In S11, a number of corresponding downsampling blocks is determined based on a size of the current coding block, and the pre-analysis information of each of the downsampling blocks is indexed.

In some embodiments, a coder firstly performs a pre-analysis operation on a video by a pre-analysis module prior to actually coding an input video. For example, the pre-analysis operation indicates that the pre-analysis module performs a lightweight video coding on the basis of downsampling the input video to acquire a frame structure, a frame type, and a coding quantization parameter (QP) for actual coding.

A coding unit performed with the pre-analysis operation is an 8×8 downsampling block. For example, assuming that a size of an original block is w×h, and a size of a downsampled block is w/2×h/2, the 8×8 downsampling block corresponds to a 16×16 coding block. That is, in the case that S11 is performed, a size of a coding block is at least 16×16, and includes 16×16, 32×32, and 64×64 in the embodiments.

In some embodiments, taking a 32×32 coding block as an example, as shown in FIG. 6, the 32×32 coding block is divided into four 16×16 coding sub-blocks, and each 16×16 coding sub-block corresponds to one downsampling block (the Lowres shown in FIG. 6), such that a number of the downsampling blocks acquired by the 32×32 coding block is four. Similarly, a 64×64 coding block is divided into 16 16×16 coding sub-blocks corresponding to 16 downsampling blocks.

As ME coding is also performed in a pre-analysis stage, in the case that the pre-analysis information of the downsampling block corresponding to the current coding block in the pre-analysis stage is found, a ME fast skipping decision for the current block is performed based on the pre-analysis information. In some embodiments, the corresponding downsampling block is indexed according to coordinate information of the current coding block. For example, in FIG. 6, the 32×32 coding block is divided into four 16×16 coding sub-blocks, and the coordinate information of the coding block is known, such that the coordinate information of each 16×16 coding sub-block is acquired. Then, a downsampling block within a coordinate range of each coding sub-block is found and determined as a downsampling block corresponding to the coding sub-block, and the pre-analysis information of the downsampling block is acquired upon the downsampling block corresponding to each coding block being found.

In some embodiments, the pre-analysis information of the downsampling block includes, but is not limited to: an inter-frame coding cost, an intra-frame coding cost, and a predicted best mode of the downsampling block.

In S12, the pre-analysis information of the downsampling blocks is summarized, and whether to skip the ME coding of the current coding block is determined based on a result of the summarization.

Upon acquisition of all the downsampling blocks corresponding to the current coding block, the pre-analysis information of all the downsampling blocks corresponding to the current coding block is summarized, and whether an ME process of the inter-frame prediction mode is skipped is determined based on a result of the summarization.

In some embodiments, S12 includes the following sub-steps.

In S121, an estimated inter-frame coding cost of the current coding block is acquired by calculating a sum of inter-frame coding costs of all the downsampling blocks corresponding to the current coding block.

For example, the 32×32 coding block in FIG. 6 indexes four downsampling blocks, and upon acquisition of the inter-frame coding cost of each downsampling block, a sum of inter-frame coding costs of the four downsampling blocks is calculated and determined as an estimated inter-frame coding cost (InterCost) of the 32×32 coding block.

In S122, an estimated intra-frame coding cost of the current coding block is acquired by calculating a sum of intra-frame coding costs of all the downsampling blocks corresponding to the current coding block.

For example, for the 32×32 coding block in FIG. 6, upon index of the intra-frame coding costs of the four downsampling blocks, a sum of the intra-frame coding costs of the four downsampling blocks is calculated and determined as an estimated intra-frame coding cost (IntraCost) of the 32×32 coding block.

In S123, a number of downsampling blocks of which the best mode is an intra-frame prediction mode in all the downsampling blocks corresponding to the current coding block is calculated, and a first ratio at which the best mode of the current coding block is the intra-frame prediction mode is determined based on the number.

For example, for the 32×32 coding block in FIG. 6, upon index of the best modes of the four downsampling blocks, a number of downsampling blocks of which the best modes are the intra-frame prediction (Intra) modes in the four downsampling blocks and the first ratio (IntraRatio) are calculated. For example, in the case that the best modes of two downsampling blocks are the Intra mode, the IntraRatio is ²⁄₄. For example, in the case that the best modes of three downsampling blocks are the Intra mode, the IntraRatio is ¾.

In S124, in the case that the first ratio is greater than a first predetermined ratio threshold, and a product of the estimated intra-frame coding cost and a first adjustment factor is less than a product of the estimated inter-frame coding cost and a second adjustment factor, the ME coding of the current coding block is skipped, wherein the first adjustment factor is less than the second adjustment factor.

In the step, upon acquisition of the InterCost, IntraCost, and IntraRatio of the current coding block, the ME coding is skipped in the case that the following conditional expression (1) is satisfied:

$$\text{if (IntraRatio} > a \; \&\& \; \text{IntraCost} * b < c * \text{InterCost)} \qquad (1),$$

$$\text{skipME} = \text{true;}$$

a represents a first predetermined ratio threshold, b represents a first adjustment factor, c represents a second adjustment factor, and skipME is skipping of ME. It should be noted that a, b, and c are adjusted according to requirements, and a coding speed is increased or decreased linearly on a premise of maintaining a consistent acceleration cost-effectiveness to meet different service requirements. For example, b is set to less than c according to service requirements. For example, default values of a, b, and c are set to 0.5, 1, and 4.

According to the above conditional expression (1), in the case that IntraCost*b<c*InterCost, and IntraRatio is great, a spatial correlation is stronger than a temporal correlation of the current block, such that the ME process is directly skipped.

In some embodiments, in the case that the current coding block is recursively coded, a decision to fast skip the ME is performed based on the coded information of the sub-block, and the decision information includes coding information of a plurality of sub-blocks acquired by recursively coding the coding block. Illustratively, the coding information of the sub-block at least includes the best mode of the sub-block and whether to further recursively divide the sub-block. As shown in FIG. 7, S420 includes the following sub-steps.

In S21, a second ratio at which the best mode of the current coding block is an intra-frame prediction mode and a third ratio at which the best mode of the current coding block is a SKIP mode are determined based on the best mode of each of the sub-blocks of the current coding block.

In some embodiments, the second ratio at which the best mode of the current coding block is the intra-frame prediction model is a ratio of a number of the sub-blocks of which the best mode is the intra-frame prediction model in the current coding block to a total number of all the sub-blocks in the current coding block. The third ratio at which the best mode of the current coding block is the SKIP mode is a ratio of a number of the sub-blocks of which the best mode is the intra-frame prediction SKIP mode in the current coding block to a total number of all the sub-blocks in the current coding block.

For example, as shown in FIG. 8, assuming that the current coding block is divided into four 16×16 coding sub-blocks, a number of the sub-blocks of which the best mode is the Intra mode is one, and a number of the sub-blocks of which the best mode is the SKIP mode is two in the four coding sub-blocks, the second ratio is ¼, and the third ratio is ²/₄.

In S22, a recursion ratio of the plurality of sub-blocks of the current coding block is determined based on whether to recursively divide each of the plurality of sub-blocks of the current coding block.

In the step, the recursion ratio of the sub-block is indicative of a ratio of the dividable sub-block in the current coding block. In some embodiments, the recursion ratio of the sub-block of the current coding block is a ratio of a number of the sub-blocks that are further recursively coded in the current coding block to a total number of all the sub-blocks of the current coding block. For example, as shown in FIG. 8, assuming that the current coding block is divided into four 16×16 coding sub-blocks, and the number of the sub-blocks capable of being further recursively coded is one in the four coding sub-blocks (a Split sub-block shown in FIG. 8), the recursion ratio of the sub-block is ¼.

In S23, whether to skip the ME coding of the current coding block is determined based on the second ratio, the third ratio, and the recursion ratio of the plurality of sub-blocks.

In some embodiments, S23 includes the following sub-steps.

In the case that the recursion ratio of the plurality of sub-blocks is greater than a predetermined recursion ratio threshold, and the second ratio is greater than a second predetermined ratio threshold, the ME coding of the current coding block is skipped.

In the step, upon acquisition of the recursion ratio of the sub-block and the second ratio, the ME coding is skipped in the case that the following conditional expression (2) is satisfied:

$$\text{if (SubSplitRatio>threshold\_}A \text{ \&\&}$$
$$\text{SubIntraRatio>threshold\_}B) \quad (2),$$

$$\text{skipME=true;}$$

SubSplitRatio represents the recursion ratio of the sub-block, SubIntraRatio represents the second ratio, threshold_A represents the predetermined recursion ratio threshold, threshold_B represents the second predetermined ratio threshold, and threshold_A and threshold_B are set according to actual service requirements.

In the case that SubSplitRatio>threshold_A and SubIntraRatio>threshold_B, there are a large number of sub-blocks Split blocks in the current coding block at a Intra ratio. In this case, the current coding block is more easily divided into four sub-blocks for coding, such that the ME process of the current coding block is skipped.

In some embodiments, S23 includes the following sub-steps.

In the case that the third ratio is greater than a third predetermined ratio threshold, and the recursion ratio of the plurality of sub-blocks is greater than a fourth predetermined ratio threshold, the ME coding of the current coding block is skipped.

In the step, upon acquisition of the recursion ratio of the sub-block and the third ratio, the ME coding is skipped in the case that the following conditional expression (3) is satisfied:

$$\text{if (SubSkipRatio>threshold\_}C \text{ \&\&}$$
$$\text{SubSplitRatio>threshold\_}D) \quad (3),$$

$$\text{skipME=true;}$$

SubSplitRatio represents the recursion ratio of the sub-block, SubSkipRatio represents the third ratio, threshold_C represents the third predetermined ratio threshold, threshold_D represents the fourth predetermined ratio threshold, and the threshold_C and the threshold_D are set according to actual service requirements.

In the case that SubSkipRatio>threshold_C and SubSplitRatio>threshold_D, there are a large number of sub-blocks Split blocks in the current coding block at a high SKIP mode ratio. In this case, the current coding block has weak motion, such that the remaining ME process is skipped.

In some embodiments, in the case that the current coding block CU is not recursively coded, whether to skip the ME coding is determined based on mode information of an executed mode. In the case, the decision information includes the information of the executed mode determined based on the executed mode. Illustratively, the information of the executed mode at least includes a SATD cost of a temporary best mode and an intra-frame prediction SATD cost. S420 includes the following sub-steps.

In the case that the current coding block is not recursively coded, and a product of the intra-frame prediction SATD cost and a third adjustment factor is less than a product of the SATD cost of the temporary best mode and a fourth adjustment factor, the ME coding of the current coding block is skipped, wherein the third adjustment factor is greater than the fourth adjustment factor.

In the embodiments, the SATD cost of the temporary best mode is a SATD cost of the temporary best mode acquired by executing a mode decision upon execution of the mode. The intra-frame prediction SATD cost is the SATD cost of the best intra-frame mode determined by a SATD rough decision in the intra-frame prediction.

Upon acquisition of the SATD cost of the temporary best mode and the intra-frame prediction SATD cost, the ME coding is skipped in the case that the following conditional expression (4) is satisfied:

$$\text{if (IntraSATDCost}*\alpha<\beta*\text{InterSATDCost)} \qquad (4)$$

$$\text{skipME=true;}$$

IntraSATDCost represents the intra-frame prediction SATD cost, InterSATDCost represents the SATD cost of the temporary best mode SATD cost, $\alpha$ represents the third adjustment factor, $\beta$ represents the fourth adjustment factor, and both $\alpha$ and $\beta$ are adjusted according to actual service requirements. For example, a default value of $\alpha$ is 5, and a default value of $\beta$ is 3.

In the case that IntraSATDCost*$\alpha$ is less than $\beta$*InterSATDCost, the spatial correlation is stronger than the temporal correlation of the current block, such that a ME coding process of the current coding block is skipped.

In some embodiments, in a scenario of skipping partially ME in the above decision-making process, for example, for non-square PUs, such as 2N×N/N×2N/2N×nD/2N×nU/nR× 2N/nL×2N (RECT/AMP), a MERGE mode, a forward ME, a backward ME, and a bidirectional ME are performed on each PU, and a best mode is acquired by comparison. As a complexity of an overall ME process is high, a decision to quickly skip the above ME of the non-square PUs is made based on an executed ME mode. The decision information includes the information of the executed mode determined based on the executed mode. The executed mode at least includes a 2N×2N mode and a BIDIR mode in FIG. 2, and the information of the executed mode includes a SATD cost of a MERGE mode executed in the 2N×2N mode, and the SATD cost of the temporary best mode.

As shown in FIG. 9, step 420 includes the following sub-steps.

In S31, in the case that the current prediction unit is a non-square prediction unit, whether the SATD cost of the MERGE mode is less than the SATD cost of the temporary best mode is determined in response to determining that a current prediction unit is a non-square prediction unit.

In S32, the MERGE mode is executed on the non-square prediction unit in response to determining that the SATD cost of the MERGE mode is less than the SATD cost of the temporary best mode, and the forward ME coding, the backward ME coding, and the bidirectional ME coding of the non-square prediction unit are skipped.

In the embodiments, in the case that the SATD cost of the MERGE mode executed in the 2N×2N mode is less than the SATD cost of the temporary best mode, only the MERGE mode is executed on the current non-square PU, and the forward ME coding, the backward ME coding, and the bidirectional ME coding processes are not performed.

In some embodiments, in the case that the current coding block is recursively coded, in determining whether to skip the forward ME, the backward ME, and the bidirectional ME of a non-square PU mode, a ratio at which the best mode of the current coding block is the SKIP mode is also considered. That is, a calculation method of a ratio of the sub-block whose best mode is the SKIP mode in the coding sub-blocks of the current coding block is referred to the above description of the third ratio, and S420 includes the following sub-steps.

In the case that the SATD cost of the MERGE mode is less than the SATD cost of the temporary best mode, and the ratio at which the best mode of the current coding block is the SKIP mode is greater than the predetermined ratio threshold, the MERGE mode is executed on the non-square prediction unit, and the forward ME coding, the backward ME coding, and the bidirectional ME coding of the non-square prediction unit are skipped.

In implementation, the coding processes of the forward ME, the backward ME, and the bidirectional ME are skipped, and only the MERGE mode of the mode is executed in the case that the current non-square mode satisfies the following conditional expression (5):

$$\text{if (SubSkipRatio>}\theta\&\&$$
$$\text{MrgCost}*a1<b1*\text{InterSATDCost)} \qquad (5)$$

$$\text{skipMELeft=true;}$$

SubSkipRatio represents the ratio at which the best mode of the current coding block is the SKIP mode, MrgCost represents the SATD cost of the MERGE mode executed in the 2N×2N mode, InterSATDCost represents the SATD cost of the temporary best mode, and $\theta$, a1, and b1 represent adjustment factors, and are set according to actual service requirements. For example, a default value of $\theta$ is set to 0.8, and default values of a1 and b1 are both 1. SkipMELeft represents that RECT/AMP only executes the MERGE mode, and does not execute the forward ME, the backward ME, and the bidirectional ME.

In the embodiments, whether to skip the ME coding of the current coding block is determined based on the acquired decision information related to the current coding block in the inter-frame predictive coding. The decision information includes the pre-analysis information determined by the coder in the lightweight video coding pre-analysis, the coding information of the plurality of sub-blocks acquired by recursively coding the current coding block, or the information of the executed mode determined based on the executed mode. Based on different decision information, a ME skipping decision is made by different fast decision solutions, such that the unnecessary PU ME is reduced, the coding complexity is reduced to a great extent, the resource overhead of the coder is reduced, and the coding compression speed of the coder is further improved. The throughput of the transcoding service is improved upon the improvement of the compression speed of the coder, such that the server resources are saved, and the transcoding cost is reduced. By the decision to skip the ME coding in the embodiments, the coding speed is increased by 18% under a condition that the loss of the compression rate of the coder is 0.2%. From a perspective of online transcoding application, 18% of server calculation resources is saved under small image quality loss, and the transcoding cost is further reduced.

FIG. 10 is a structural block diagram of an apparatus for video predictive coding according to an embodiment of the present disclosure. The apparatus includes the following modules:

a decision information acquiring module 1001, configured to acquire decision information related to a current coding block in inter-frame predictive coding, wherein the decision information includes: pre-analysis information determined by a coder in a lightweight video coding pre-analysis, coding information of a plurality of sub-blocks acquired by recursively coding the current coding block, or information of an executed mode determined based on the executed mode; and a skipping ME determining module 1002, configured to determine, based on the decision information, whether to skip ME coding of the current coding block.

In some embodiments, in the case that the decision information is the pre-analysis information determined by the coder in the lightweight video coding pre-analysis, the skipping ME determining module 1002 includes the following sub-modules:

a pre-analysis information indexing sub-module, configured to determine, based on a size of the current coding block, a number of corresponding downsampling blocks, and index the pre-analysis information of each of the downsampling blocks.

a pre-analysis information determining sub-module, configured to summarize the pre-analysis information of the downsampling blocks, and determine, based on a result of the summarization, whether to skip the ME coding of the current coding block.

In some embodiments, the pre-analysis information of the downsampling block includes an inter-frame coding cost, an intra-frame coding cost, and a predicted best mode of the downsampling block.

The pre-analysis information determining sub-module is configured to:

acquire an estimated inter-frame coding cost of the current coding block by calculating a sum of inter-frame coding costs of all the downsampling blocks corresponding to the current coding block;

acquire an estimated intra-frame coding cost of the current coding block by calculating a sum of intra-frame coding costs of all the downsampling blocks corresponding to the current coding block;

calculate a number of downsampling blocks of which the best mode is an intra-frame prediction mode in all the downsampling blocks corresponding to the current coding block, and determine, based on the number, a first ratio at which the best mode of the current coding block is the intra-frame prediction mode; and skip the ME coding of the current coding block in the case that the first ratio is greater than a first predetermined ratio threshold, and a product of the estimated intra-frame coding cost and a first adjustment factor is less than a product of the estimated inter-frame coding cost and a second adjustment factor, wherein the first adjustment factor is less than the second adjustment factor.

In some embodiments, in the case that the decision information is the coding information of the plurality of sub-blocks acquired by recursively coding the current coding block, the coding information of the plurality of sub-blocks includes a best mode of each of the plurality of sub-blocks and whether to recursively divide each of the plurality of sub-blocks.

The skipping ME determining module 1002 includes the following sub-modules:

a ratio calculating sub-module, configured to determine, based on the best mode of each of the plurality of sub-blocks of the current coding block, a second ratio at which the best mode of the current coding block is the intra-frame prediction mode, and a third ratio at which the best mode of the current coding block is a skipping (SKIP) mode; and determine a recursion ratio of the plurality of sub-blocks of the current coding block based on whether to recursively divide each of the plurality of sub-blocks of the current coding block; and a ratio determining sub-module, configured to determine, based on at least one of the second ratio, the third ratio, and the recursion ratio of the plurality of sub-blocks, whether to skip the ME coding of the current coding block.

In some embodiments, the ratio determining sub-module is configured to:

skip the ME coding of the current coding block in the case that the recursion ratio of the plurality of sub-blocks is greater than a predetermined recursion ratio threshold, and the second ratio is greater than a second predetermined ratio threshold;

or, skip the ME coding of the current coding block in the case that the third ratio is greater than a third predetermined ratio threshold, and the recursion ratio of the plurality of sub-blocks is greater than a fourth predetermined ratio threshold.

In some embodiments, in the case that the decision information is the information of the executed mode determined based on the executed mode, the information of the executed mode includes: a SATD cost of a temporary best mode and an intra-frame prediction SATD cost.

The skipping ME determining module 1002 includes the following sub-modules:

a SATD cost determining sub-module, configured to skip the ME coding of the current coding block in the case that the current coding block is not recursively coded, and a product of the intra-frame prediction SATD cost and a third adjustment factor is less than a product of the SATD cost of the temporary best mode and a fourth adjustment factor, wherein the third adjustment factor is greater than the fourth adjustment factor.

In some embodiments, in the case that the decision information is the information of the executed mode determined based on the executed mode, the executed mode at least includes a 2N×2N mode and a BIDIR mode, and the information of the executed mode includes: an SATD cost of a MERGE mode executed in the 2N×2N mode, and the SATD cost of the temporary best mode.

The skipping ME determining module 1002 includes the following sub-modules:

a first part ME skipping determining sub-module, configured to determine, in response to determining that a current prediction unit is a non-square prediction unit, whether the SATD cost of the MERGE mode is less than the SATD cost of the temporary best mode; and execute the MERGE mode on the non-square prediction unit in response to determining that the SATD cost of the MERGE mode is less than the SATD cost of the temporary best mode, and skip the forward ME coding, the backward ME coding, and the bidirectional ME coding of the non-square prediction unit.

In some embodiments, in the case that the current coding block is recursively coded, the information of the executed mode further includes a ratio at which a best mode of the current coding block is a SKIP mode.

The skipping ME determining module 1002 includes the following sub-modules:

a first part ME skipping determining sub-module, configured to execute the MERGE mode on the non-square prediction unit in the case that the SATD cost of the MERGE mode is less than the SATD cost of the temporary best mode, and the ratio at which the best mode of the current coding block is the SKIP mode is greater than a predetermined ratio threshold, and skip the forward ME coding, the backward ME coding, and the bidirectional ME coding of the non-square prediction unit.

It should be noted that the apparatus for video predictive coding in the embodiments of the present disclosure performs the method for video predictive coding in the embodiments of the present disclosure, and has corresponding functional modules and beneficial effects to execute the methods.

FIG. 11 is a schematic structural diagram of an electronic device according to some embodiments of the present disclosure. As shown in FIG. 11, the electronic device includes a processor 1110, a memory 1120, an input apparatus 1130, and an output apparatus 1140. The number of the processors 1110 in the electronic device is one or more, and FIG. 11 is illustrated by taking one processor 1110 as an example. The processor 1110, the memory 1120, the input apparatus 1130, and the output apparatus 1140 in the electronic device are connected by a bus or other means, and by way of example, and FIG. 11 is illustrated by taking the bus as an example.

The memory 1120, as a computer-readable storage medium, is configured to store software programs, computer executable programs, and modules, such as program instructions/modules corresponding to the method in the embodiments of the present disclosure. By executing software programs, instructions, and modules stored in the memory 1120, the processor 1110 performs various functional applications and data processing of the electronic device, that is, achieves the above method.

The memory 1120 mainly includes a program storage region and a data storage region.

The program storage region stores an operating system and an application program required by at least one function. The storage data region stores data created based on a use of a terminal, and the like. Furthermore, the memory 1120 includes a high speed random access memory, and further includes a non-volatile memory, such as at least one magnetic disk memory, flash memory, or other non-volatile solid state memory. In some embodiments, the memory 1120 includes memories arranged remotely relative to the processor 1110, the remote memories are connected to the electronic device over a network. Examples of the above network include, but are not limited to, the Internet, intranets, local area networks, mobile communication networks, and combinations thereof.

The input apparatus 1130 is configured to receive input digital or character information, and generate key signal inputs related to user settings and function control of the electronic device. The output apparatus 1140 includes a display device, such as a display screen.

Some embodiments of the present disclosure further provide a storage medium including computer executable instructions. The computer executable instructions, when executed by a processor of a server, causes the processor to perform the method in any one of the embodiments of the present disclosure.

Based on the above description of the embodiments, it is obvious for those skilled in the art that the present disclosure is implemented either through software and necessary general-purpose hardware, or through hardware. Based on such understanding, the technical solutions of the present disclosure, or the parts that contribute to the related art are substantially embodied in the form of a software product. The computer software product is stored in a computer-readable storage medium, such as a floppy disk, a read-only memory (ROM), a random-access memory (RAM), a flash memory (FLASH), a hard disk, or an optical disk of a computer, and includes several instructions, such that a computer device (a personal computer, a server, or a network device) performs the method according to the embodiments of the present disclosure. The computer-readable storage medium is a non-transitory computer-readable storage medium.

It should be noted that in the above embodiments of the apparatus, a plurality of units and modules are only divided based on function logic, but are not limited to the above division, as long as corresponding functions are achieved. In addition, specific names of multiple function units are merely for convenience of distinguishing from each other, and are not intended to limit the protection scope of the present disclosure.

What is claimed is:

1. A method for video predictive coding, comprising:
acquiring decision information related to a current coding block in inter-frame predictive coding, wherein the decision information comprises one of: pre-analysis information determined by a coder in a lightweight video coding pre-analysis, coding information of a plurality of sub-blocks acquired by recursively coding the current coding block, and information of an executed mode determined based on the executed mode; and
determining, based on the decision information, whether to skip motion estimation (ME) coding of the current coding block, wherein the skipping the ME coding comprises skipping all ME processes or partially skipping ME processes;
wherein in response to determining that the decision information is the coding information of the plurality of sub-blocks acquired by recursively coding the current coding block, the coding information of the plurality of sub-blocks comprises a best mode of each of the plurality of sub-blocks and whether to recursively divide each of the plurality of sub-blocks; and
determining, based on the decision information, whether to skip the ME coding of the current coding block comprises:
determining, based on the best mode of each of the plurality of sub-blocks of the current coding block, a second ratio at which the best mode of the current coding block is an intra-frame prediction mode, and a third ratio at which the best mode of the current coding block is a skipping (SKIP) mode;
determining a recursion ratio of the plurality of sub-blocks of the current coding block based on whether to recursively divide each of the plurality of sub-blocks of the current coding block; and
determining, based on at least one of the second ratio, the third ratio, and the recursion ratio of the plurality of sub-blocks, whether to skip the ME coding of the current coding block.

2. The method according to claim 1, wherein in response to determining that the decision information is the pre-analysis information determined by the coder in the lightweight video coding pre-analysis, determining, based on the decision information, whether to skip the ME coding of the current coding block comprises:
determining, based on a size of the current coding block, a number of corresponding downsampling blocks, and indexing pre-analysis information of each of the downsampling blocks, wherein the number of the downsampling blocks is plural; and summarizing the pre-analysis information of the down-sampling blocks, and determining, based on a result of the summarization, whether to skip the ME coding of the current coding block.

3. The method according to claim 2, wherein the pre-analysis information of the downsampling block comprises an inter-frame coding cost, an intra-frame coding cost, and a predicted best mode of the downsampling block; and summarizing the pre-analysis information of the down-sampling blocks, and determining, based on the result of the summarization, whether to skip the ME coding of the current coding block comprise:

acquiring an estimated inter-frame coding cost of the current coding block by calculating a sum of the inter-frame coding costs of all the downsampling blocks corresponding to the current coding block;

acquiring an estimated intra-frame coding cost of the current coding block by calculating a sum of the intra-frame coding costs of all the downsampling blocks corresponding to the current coding block;

calculating a number of the downsampling blocks of which the best mode is an intra-frame prediction mode in all the downsampling blocks corresponding to the current coding block, and determining, based on the number, a first ratio at which the best mode of the current coding block is the intra-frame prediction mode; and skipping the ME coding of the current coding block in response to determining that the first ratio is greater than a first predetermined ratio threshold, and that a product of the estimated intra-frame coding cost and a first adjustment factor is less than a product of the estimated inter-frame coding cost and a second adjustment factor, wherein the first adjustment factor is less than the second adjustment factor.

4. The method according to claim 1, wherein determining, based on at least one of the second ratio, the third ratio, and the recursion ratio of the plurality of sub-blocks, whether to skip the ME coding of the current coding block comprises:

skipping the ME coding of the current coding block in response to determining that the recursion ratio of the plurality of sub-blocks is greater than a predetermined recursion ratio threshold, and that the second ratio is greater than a second predetermined ratio threshold; or skipping the ME coding of the current coding block in response to determining that the third ratio is greater than a third predetermined ratio threshold, and that the recursion ratio of the plurality of sub-blocks is greater than a fourth predetermined ratio threshold.

5. The method according to claim 1, wherein
in response to determining that the decision information is the information of the executed mode determined based on the executed mode, the information of the executed mode comprises a sum of absolute transformed difference (SATD) cost of a temporary best mode and an intra-frame prediction SATD cost; and determining, based on the decision information, whether to skip the ME coding of the current coding block comprises:

skipping the ME coding of the current coding block in response to determining that the current coding block is not recursively coded, and that a product of the intra-frame prediction SATD cost and a third adjustment factor is less than a product of the SATD cost of the temporary best mode and a fourth adjustment factor, wherein the third adjustment factor is greater than the fourth adjustment factor.

6. The method according to claim 1, wherein
in response to determining that the decision information is the information of the executed mode determined based on the executed mode, the executed mode at least comprises a 2N×2N mode and a BIDIR mode, and the information of the executed mode comprises an SATD cost of a MERGE mode executed in the 2N×2N mode, and the SATD cost of a temporary best mode, wherein N is a positive integer; and determining, based on the decision information, whether to skip the ME coding of the current coding block comprises:

determining, in response to determining that a current prediction unit is a non-square prediction unit, whether the SATD cost of the MERGE mode is less than the SATD cost of the temporary best mode; and executing the MERGE mode on the non-square prediction unit in response to determining that the SATD cost of the MERGE mode is less than the SATD cost of the temporary best mode, and skipping forward ME coding, backward ME coding, and bidirectional ME coding of the non-square prediction unit.

7. The method according to claim 6, wherein in response to determining that the current coding block is recursively coded, the information of the executed mode further comprises a ratio at which a best mode of the current coding block is a SKIP mode; and determining, based on the decision information, whether to skip the ME coding of the current coding block further comprises:

executing the MERGE mode on the non-square prediction unit in response to determining that the SATD cost of the MERGE mode is less than the SATD cost of the temporary best mode, and that the ratio at which the best mode of the current coding block is the SKIP mode is greater than a predetermined ratio threshold, and skipping the forward ME coding, the backward ME coding, and the bidirectional ME coding of the non-square prediction unit.

8. An electronic device for video predictive coding, comprising: a memory, a processor, and a computer program stored on the memory and runnable on the processor, wherein the processor, when loading and running the program, is caused to:

acquire decision information related to a current coding block in inter-frame predictive coding, wherein the decision information comprises one of: pre-analysis information determined by a coder in a lightweight video coding pre-analysis, coding information of a plurality of sub-blocks acquired by recursively coding the current coding block, and information of an executed mode determined based on the executed mode; and determine, based on the decision information, whether to skip motion estimation (ME) coding of the current coding block, wherein the skipping the ME coding comprises skipping all ME processes or partially skipping partially ME processes;

wherein in response to determining that the decision information is the coding information of the plurality of sub-blocks acquired by recursively coding the current coding block, the coding information of the plurality of sub-blocks comprises a best mode of each of the plurality of sub-blocks and whether to recursively divide each of the plurality of sub-blocks; and the processor, when loading and running the program, is caused to:

determine, based on the best mode of each of the plurality of sub-blocks of the current coding block, a second ratio at which the best mode of the current coding block is an intra-frame prediction mode, and a third ratio at which the best mode of the current coding block is a skipping (SKIP) mode;

determine a recursion ratio of the plurality of sub-blocks of the current coding block based on whether to recursively divide each of the plurality of sub-blocks of the current coding block; and determine, based on at least one of the second ratio, the third ratio, and the recursion ratio of the plurality of sub-blocks, whether to skip the ME coding of the current coding block.

9. A non-transitory non-volatile-computer-readable storage medium, storing a computer program therein, wherein the computer program, when loaded and run by a processor, causes the processor to:

acquire decision information related to a current coding block in inter-frame predictive coding, wherein the decision information comprises one of: pre-analysis information determined by a coder in a lightweight video coding pre-analysis, coding information of a plurality of sub-blocks acquired by recursively coding the current coding block, and information of an executed mode determined based on the executed mode; and determine, based on the decision information, whether to skip motion estimation (ME) coding of the current coding block, wherein the skipping the ME coding comprises skipping all ME processes or partially skipping ME processes;

wherein in response to determining that the decision information is the coding information of the plurality of sub-blocks acquired by recursively coding the current coding block, the coding information of the plurality of sub-blocks comprises a best mode of each of the plurality of sub-blocks and whether to recursively divide each of the plurality of sub-blocks; and the processor, when loading and running the program, is caused to:

determine, based on the best mode of each of the plurality of sub-blocks of the current coding block, a second ratio at which the best mode of the current coding block is an intra-frame prediction mode, and a third ratio at which the best mode of the current coding block is a skipping (SKIP) mode;

determine a recursion ratio of the plurality of sub-blocks of the current coding block based on whether to recursively divide each of the plurality of sub-blocks of the current coding block; and determine, based on at least one of the second ratio, the third ratio, and the recursion ratio of the plurality of sub-blocks, whether to skip the ME coding of the current coding block.

10. The electronic device according to claim 8, wherein in response to determining that the decision information is the pre-analysis information determined by the coder in the lightweight video coding pre-analysis, the processor, when loading and running the program, is caused to:

determine, based on a size of the current coding block, a number of corresponding downsampling blocks, and index pre-analysis information of each of the downsampling blocks, wherein the number of the downsampling blocks is plural; and summarize the pre-analysis information of the downsampling blocks, and determine, based on a result of the summarization, whether to skip the ME coding of the current coding block.

11. The electronic device according to claim 10, wherein the pre-analysis information of the downsampling block comprises an inter-frame coding cost, an intra-frame coding cost, and a predicted best mode of the downsampling block; and the processor, when loading and running the program, is caused to:

acquire an estimated inter-frame coding cost of the current coding block by calculating a sum of the inter-frame coding costs of all the downsampling blocks corresponding to the current coding block;

acquire an estimated intra-frame coding cost of the current coding block by calculating a sum of the intra-frame coding costs of all the downsampling blocks corresponding to the current coding block;

calculate a number of the downsampling blocks of which the best mode is an intra-frame prediction mode in all the downsampling blocks corresponding to the current coding block, and determine, based on the number, a first ratio at which the best mode of the current coding block is the intra-frame prediction mode; and skip the ME coding of the current coding block in response to determining that the first ratio is greater than a first predetermined ratio threshold, and that a product of the estimated intra-frame coding cost and a first adjustment factor is less than a product of the estimated inter-frame coding cost and a second adjustment factor, wherein the first adjustment factor is less than the second adjustment factor.

12. The electronic device according to claim 8, wherein the processor, when loading and running the program, is caused to:

skip the ME coding of the current coding block in response to determining that the recursion ratio of the plurality of sub-blocks is greater than a predetermined recursion ratio threshold, and that the second ratio is greater than a second predetermined ratio threshold; or skip the ME coding of the current coding block in response to determining that the third ratio is greater than a third predetermined ratio threshold, and that the recursion ratio of the plurality of sub-blocks is greater than a fourth predetermined ratio threshold.

13. The electronic device according to claim 8, wherein in response to determining that the decision information is the information of the executed mode determined based on the executed mode, the information of the executed mode comprises a sum of absolute transformed difference (SATD) cost of a temporary best mode and an intra-frame prediction SATD cost; and the processor, when loading and running the program, is caused to:

skip the ME coding of the current coding block in response to determining that the current coding block is not recursively coded, and that a product of the intra-frame prediction SATD cost and a third adjustment factor is less than a product of the SATD cost of the temporary best mode and a fourth adjustment factor, wherein the third adjustment factor is greater than the fourth adjustment factor.

14. The electronic device according to claim 8, wherein in response to determining that the decision information is the information of the executed mode determined based on the executed mode, the executed mode at least comprises a 2N×2N mode and a BIDIR mode, and the information of the executed mode comprises an SATD cost of a MERGE mode executed in the 2N×2N mode, and the SATD cost of a temporary best mode, wherein N is a positive integer; and the processor, when loading and running the program, is caused to:

determine, in response to determining that a current prediction unit is a non-square prediction unit, whether the SATD cost of the MERGE mode is less than the SATD cost of the temporary best mode; and execute the MERGE mode on the non-square prediction unit in response to determining that the SATD cost of the MERGE mode is less than the SATD cost of the temporary best mode, and skip forward ME coding, backward ME coding, and bidirectional ME coding of the non-square prediction unit.

15. The electronic device according to claim 14, wherein in response to determining that the current coding block is recursively coded, the information of the executed mode further comprises a ratio at which a best mode of the current coding block is a SKIP mode; and the processor, when loading and running the program, is caused to: execute the MERGE mode on the non-square prediction unit in response to determining that the SATD cost of the MERGE mode is less than the SATD cost of the temporary best mode, and that the ratio at which the best mode of the current coding block is the SKIP mode is greater than a predetermined ratio threshold, and skip the forward ME coding, the backward ME coding, and the bidirectional ME coding of the non-square prediction unit.

* * * * *